April 28, 1959 J. A. PULERA ET AL 2,884,027
JIG SAWS
Filed Oct. 3, 1955 2 Sheets-Sheet 1
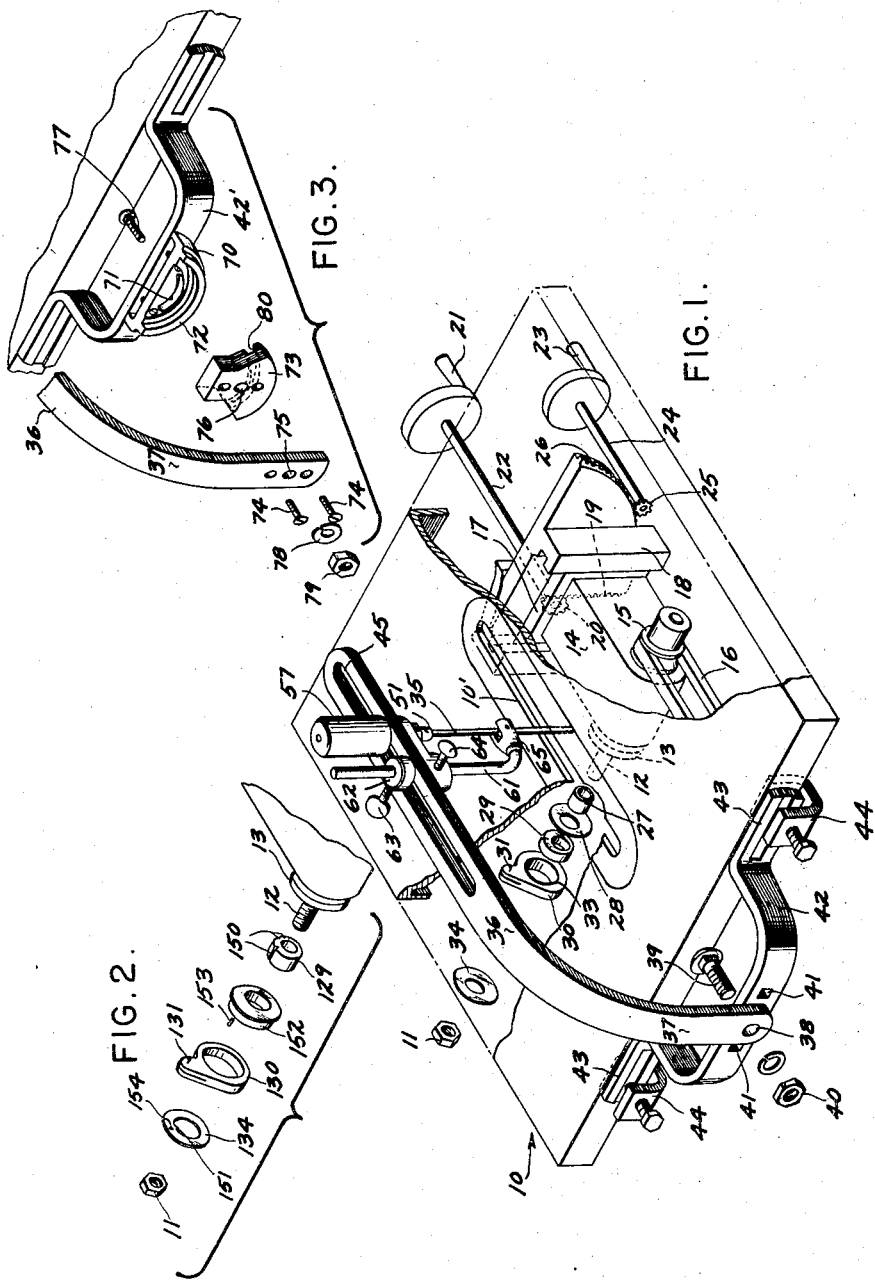
INVENTORS.
Joseph C. Pulera
BY Zinon C. Possis
Merchant & Morrill
ATTORNEYS April 28, 1959   J. A. PULERA ET AL   2,884,027
JIG SAWS
Filed Oct. 3, 1955   2 Sheets-Sheet 2

INVENTORS
Joseph A. Pulera
Zinon C. Possis
BY
Morsell & Morsell
ATTORNEYS

United States Patent Office 2,884,027
Patented Apr. 28, 1959

2,884,027
JIG SAWS

Joseph A. Pulera, Silver Lake, Wis., and Zinon C. Possis, Minneapolis, Minn.; said Possis assignor to said Pulera Application October 3, 1955, Serial No. 538,239

1 Claim. (Cl. 143—73)

This invention relates to improvements in jig saws, and more particularly to attachments for converting a circular blade bench saw into a jig saw. The invention is an improvement over the construction disclosed in copending application of Joseph A. Pulera, Serial No. 413,269 filed March 1, 1954, now Patent No. 2,725,905, issued December 6, 1955.

Most home craftsmen have circular blade bench saws, but cannot afford to have a power-driven jig saw in addition, and it is a general object of the present invention to provide improved mechanism whereby a circular blade bench saw can be quickly and effectively converted to a power-driven jig saw.

A further object of the present invention is to provide a jig saw attachment which is so worked out that it may be adapted for use on a wide variety of types and makes of circular bench saws.

A further object of the invention is to provide a jig saw attachment which permits the use of the arbor of a conventional circular saw at high r.p.m. to operate a jig saw blade with a relatively short stroke.

A further object of the invention is to provide a device as above described wherein the length of the stroke and the blade tension may be readily adjusted, and wherein blades of different length may be readily accommodated. The adjustment of the stroke permits the use of different types of blades, use on different materials, and also permits the jig saw attachment to be adapted for more efficient use with a particular rotary saw.

A further object of the invention is to provide a jig saw attachment which permits connection of the jig saw blade in the same location on the arbor as is used when a circular saw blade is employed.

A further object of the invention is to provide a jig saw attachment having an improved blade guide which furnishes a rolling support against both backward and sidewise movement of the blade during use.

A still further object of the invention is to provide an improved jig saw attachment which permits the use of the blade guide even if the upper supporting arm for the blade is shifted to a position at right angles to its normal position. Such altered position is desirable to get the upper supporting arm out of the path of the end of a board when ripping is being done.

A still further object of the invention is to provide a jig saw attachment which permits tilting of the upper supporting arm for the blade in a manner to coincide with the tilt of the arbor of the bench saw whereby sawing at an oblique angle to the table may be performed.

With the above and other objects in view, the invention consists of the improved jig saw, and all of its parts and combinations, as set forth in the claim, and all equivalents thereof.

In the accompanying drawings, illustrating several embodiments of the invention, in which the same reference numerals designate the same parts in all of the views:

Fig. 1 is a perspective view of a portion of a circular blade bench saw showing parts of the improved jig saw attachment connected thereto, parts being broken away, the lower blade holding and driving parts which are to fit onto the arbor being shown in exploded arrangement;

Fig. 2 is a fragmentary perspective view in exploded form showing a modified type of drive and support for the lower end of the jig saw blade;

Fig. 3 is a fragmentary perspective view showing a modified type of attachment for connecting the upper blade supporting arm to the table in a manner which permits tilting of the upper blade support so that it will conform to the tilt of the arbor;

Figure 4:
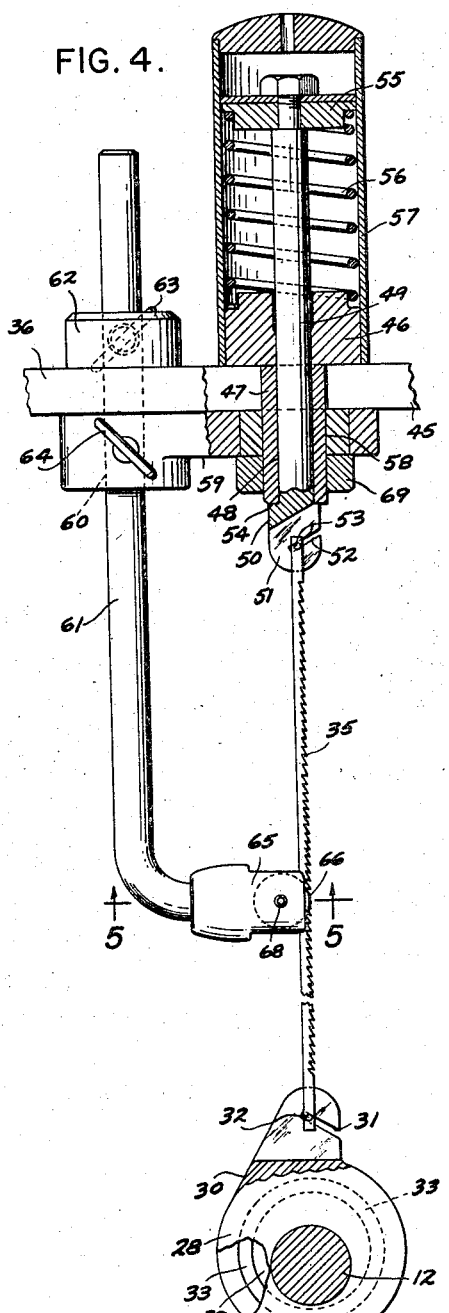
Fig. 4 is a fragmentary view, partly in elevation and partly in vertical section, showing the upper and lower supports for the blade, and showing the blade guide in assembled position for normal use.

Referring more particularly to the drawings the numeral 10 designates the bench of a conventional type of bench saw having a blade opening 10', which device is normally adapted for use with a circular saw. Said circular saw is usually held by a nut 11 on the threaded end of an arbor 12 against a collar 13, the latter being rotatable with the arbor. The arbor is suitably journaled through a support 14 and carries a pulley 15 on its outer end. A suitably driven endless belt 16 drives the pulley. The support 14 is vertically slidably mounted as at 17, in any conventional manner, in a downwardly projecting guideway 18. A rack or other conventional mechanism shown diagrammatically at 19 may be engaged by a pinion 20. The latter is rotated manually by a crank 21 on the end of a suitably journaled shaft 22. By turning the crank 21, the arbor may be adjusted upwardly or downwardly.

In addition to the above, any conventional tilting mechanism such as that illustrated diagrammatically in Fig. 1, and to which the numerals 23, 24, 25 and 26 are applied, may be utilized to change the angle of the arbor and saw blade with respect to the table top. Such mechanisms are conventional in circular blade bench saws.

In order to convert the conventional bench saw to a jig saw by use of the improved attachment, the nut 11, as well as the circular saw blade, are removed from the threaded end of the arbor. In addition, any guard for the circular saw must also be removed. When using the form of drive and lower support for the jig saw blade which is shown in Fig. 1, if the shaft is small, a liner 27 is first slipped over the end of the arbor 12 into abutment with the collar 13. If the shaft is of proper size to fit the eccentric, no liner is necessary. Then a washer 28 is slipped over the liner until the washer abuts the collar 13. Next the eccentric 29 is slipped over the arbor and the blade holding ring 30 over the eccentric. The latter has a bifurcated extension with a slot 31 for receiving the conventional jig saw blade 35. The blade holder 30 preferably has a bushing 33 rigidly connected thereto. Fitted against the outer side of the blade holder 30 is a washer 34. When the nut 11 is tightened, the liner 27, eccentric 29, and washers 28 and 34 are clamped into position so that they rotate as a unit with the arbor. The blade holder 30 is of less width than the space between the washers 34 and 28 so that the blade holder is not clamped by the nut, the eccentric 29 being rotatable within the opening of the blade holder 30.

Figures 6, 7:
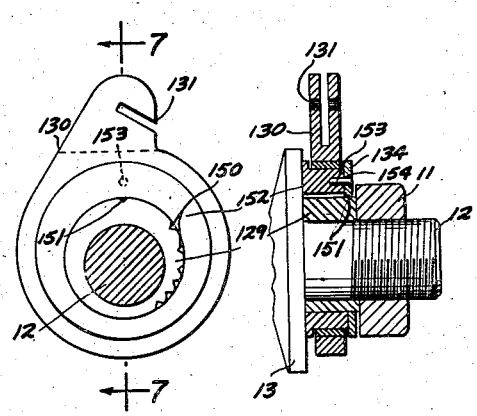
Fig. 6 is a transverse sectional view through an arbor showing a lower blade support and drive of the type illustrated in Fig. 2 in assembled position.
Fig. 7 is a sectional view taken on the line 7—7 of Fig. 6.

In the modification illustrated in Figs. 2, 6 and 7, there is an eccentric 129 which fits on the arbor 12 up against the collar 13. This eccentric has transversely extending peripherally spaced V-shaped recesses 150 in its periphery which are adapted to be selectively engaged by a pointed projection 151 on the washer member 134. The eccentric 129 fits within an outer eccentric 152 which has an indexing pin 153 projecting therefrom which is adapted to engage a hole 154 in the washer 134. The eccentric member 152 fits within the center opening of the blade holder 130 and the latter has a bifurcated extension with transverse slots 131 which correspond to the slots 31 of the form of the invention shown in Fig. 1.

In the form of the invention of Figs. 2, 6 and 7, after the eccentric 129 has been slipped onto the arbor 12 and up against the collar 13, then the outer eccentric 152 is slipped on as shown in Fig. 7. Next the blade holder 130 is slipped over the outer eccentric 152. Then the washer 134 is put on in the position shown in Fig. 7, with the pin 153 of the member 152 extending into the hole 154 of the washer. This, however, is not done until after the inner eccentric 129 has been rotated within the outer eccentric 152 to a selected position to cause a selected one of its recesses 150 to be engaged by the tooth 151 of the washer 134. In this way the position of the inner eccentric may be varied to adjust the throw and thereby adjust the length of the stroke of the jig saw blade 35. Thus the length of the stroke depends upon which one of the notches 150 is engaged with the tooth 151. By adjusting the stroke it is possible to adapt the jig saw to use with different materials and to use with different types of blades. As a practical matter this adjustment may be made to best suit the particular conditions encountered. After the desired position is obtained, the nut 11 is tightened to clamp the inner eccentric to the arbor.

Figures 8, 9:
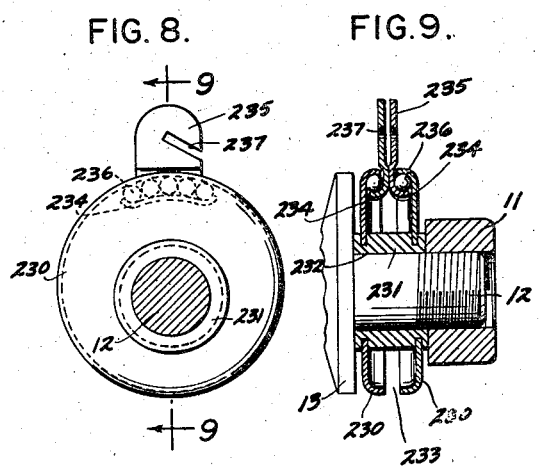
Fig. 8 is a view similar to Fig. 6 showing still another form of lower blade support and drive.
Fig. 9 is a sectional view taken on the line 9—9 of Fig. 8.

Another form of drive and lower support for the jig saw blade is illustrated in Figs. 8 and 9. In this device there are spaced circular shells 230 which are integral with a bushing 231. The latter has an opening 232 which is eccentric with respect to the peripheries of the shells 230, and through which the arbor 12 is adapted to extend, the nut 11 being adapted to clamp the bushing 231 between it and the collar 13 so that the bushing and shells 230 rotate with the arbor. The shells 230 are spaced apart to provide a circumferential slot 233 through which the lower portions 234 of blade attachment members 235 extend, the extreme lower ends being hooked so as to hold ball bearings 236 between them and the inner sides of the periphery of the shells 230. The members 235 have slots 237 for detachably receiving the ends of the crosspin 32 of the jig saw blade, the blade fitting between the two members 235. With this arrangement, when the arbor is rotated, the peripheries of the shells 230 will rotate eccentrically, causing an up-and-down reciprocating motion to be transmitted to the lower end of the jig saw blade. During this movement the ball bearings 236 ride on the inner peripheries of the shells 230.

An upper supporting arm 36 for the jig saw blade, which arm is formed of resilient metal, has a downwardly curved end 37 provided with a hole 38. This may be connected by a bolt 39 and nut 40 with any one of several selected holes 41 in a supporting bracket 42. The latter has a U-shaped central portion so as to straddle any projections which might be present on the edge of the table, and the member 42 has outwardly directed ends 43 which are detachably secured by clamps 44 to the edge of the table as shown in Fig. 1.

The upper horizontal portion of the arm 36 has a longitudinal slot 45. Seated on top of the arm 36 is a block 46 having a portion 47 of reduced diameter projecting downwardly therefrom through the slot 45 (see Fig. 4). Slidable in alined vertical bores 48 of the portions 46 and 47 is the stem 49 of an upper blade holder 50, the latter having a bifurcated lower end 51 provided with slots 52 for receiving the ends of the crosspin 53 at the upper end of the jig saw blade 35, the upper end of the blade proper being positioned between the two sides of the bifurcated holder. The head of the member 50 is of larger diameter than the stem to provide a stop 54. The upper end of the stem 49 projects a substantial distance above the block 46 and has a collar 55 suitably connected thereto, there being a spring 56 between the collar 55 and the block 46. If desired the spring may be surrounded by a housing 57. The depending portion 47 also extends through an opening 58 in a blade guide supporting arm 59. The opposite end of the arm 59 is provided with a bore 60 for receiving the upwardly projecting stem 61 of the blade guiding member. During normal use, the stem 61 will project through the slot 45 of the arm 36 as shown in Fig. 4 and an upper collar 62, having a set screw 63, may be secured in the position shown in Fig. 4. The arm 59 is also provided with a set screw 64. It is apparent from Fig. 4 that by loosening the set screws 63 and 64 the elevation of the blade guide may be varied.

Figure 5:
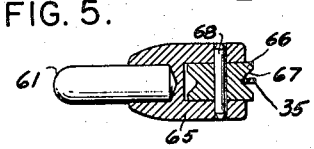
Fig. 5 is a sectional view taken on the line 5—5 of Fig. 4.

The lower end of the stem 61 is bent horizontally as shown in Fig. 4 and carries a forked portion 65 having a wheel 66 with a V-groove 67 as shown in Fig. 5, the wheel being rotatable on a pin 68. Due to the V-groove 67 the blade is supported against backward movement, and also against lateral displacement.

Because of the ingenious arrangement of the arm 59, it is possible to change the upper supporting arm 36 for the blade to a position at right angles to the position shown in Fig. 1 when it is desired to rip. Furthermore, this change can be made without sacrificing the use of the blade guide. When it is desired to make this change, the set screws 63 and 64 of Fig. 4 are loosened, and the stem 61 is withdrawn completely out of engagement with the slot 45 and arm 36. Next the arm 36 is swung to a position at right angles to the position shown in Fig. 1, the bracket 42 being also moved to an adjacent side of the table. The blade guide supporting arm 59 is, however, left in the same position as shown in Fig. 1, the nut 69 holding the arm in place. The stem 61 is then replaced in the opening 60 in the arm 59 and the set screw 64 is tightened. The upper end of the stem 61, of course, does not pass through the slot 45 of the upper blade support, because this slot is no longer in registration as it has been swung to a position at right angles.

If it is desired to have the jig saw blade at an oblique angle with respect to the table, then the arbor may be tilted in the customary manner through manipulation of the crank 23, and the arm portion 37 may be tilted on the bolt 39.

To obtain more perfect conformity of parts for tilting, the arrangement of Fig. 3 may be used. Here the bracket 42' has a semi-circular projection 70 having arcuate slot 71 and a semi-circular track 72. A pivot member 73 is adapted to be connected by screws 74 with the lower end of the blade supporting arm 37. There are also registering holes 75 and 76 in the arm and member 73 for receiving a bolt 77, there being a lock washer 78 and nut 79 for the end of said bolt. When the parts of Fig. 3 are assembled, the bolt 77 passes through the arcuate slot 71 and through the holes 76 and 75. Then, when the nut 79 is loosened, the arcuate slot 80 of the member 73 will ride on the arcuate track 72 to insure proper tilting of the arm 36. With this arrangement the center of tilt of both the arm and blade may be made to coincide. The bracket 42' is, of course, connected to the table by means of the clamps 44 of Fig. 1.

In the form of invention of Fig. 1, if there are any projections on the table edge which prevent proper centering of the bracket 42, the bracket may be shifted in one direction or the other, and one of the other holes 41 may be used for the bolt 39.

In use of any of the forms of the invention, when the arbor 12 is rotated, the eccentrics 29, 152 or 230 will cause a reciprocating motion of the blade, the blade having rolling contact in the groove 67 of the wheel 66 while reciprocating, and being supported against backward or lateral movement.

It is apparent that with the form of the invention of Fig. 6, the length of the stroke may be varied to suit particular requirements. It is also clear from Fig. 4 that the blade guide 65 may still be used in its normal position, even if the upper supporting arm for the blade is swung to a position at one side to permit ripping.

Various changes and modifications may be made without departing from the spirit of the invention, and all of such changes are contemplated as may come within the scope of the claim.

What we claim is:

A jig saw attachment for a circular blade bench saw of the type having a rotatable arbor comprising an upper support having one end connectable to the bench saw and having a supporting portion, a jig saw blade having its upper end detachably connected to said supporting portion, a circular blade holder having a peripheral projection with means detachably engaging the lower end of said jig saw blade and having a bearing hole, a first disc having an eccentric hole through which said arbor is adapted to extend and having spaced peripheral recesses, a second disc having an eccentric hole of a size to receive and fit the periphery of the first disc, means including a washer having a projection for cooperation with one of said peripheral recesses for locking said first disc in a selected position of rotation within said second disc, means for non-rotatably connecting said washer to said second disc, means for rigidly detachably connecting said first disc to the arbor for rotation therewith, the periphery of the second disc being positioned for rotation in the bearing hole of the blade holder to cause operating movement of the jig saw blade when the arbor is rotated.

References Cited in the file of this patent

UNITED STATES PATENTS

| | | |
|---|---|---|
| 42,276 | Deputy | Apr. 12, 1864 |
| 272,511 | Angell | Feb. 20, 1883 |
| 732,606 | Topliff | June 30, 1903 |
| 1,565,820 | Saunders | Dec. 15, 1925 |
| 1,781,474 | Pierson | Nov. 11, 1930 |
| 2,067,399 | Hughes | Jan. 12, 1937 |
| 2,540,329 | Gray | Feb. 6, 1951 |
| 2,652,863 | Grabinski | Sept. 22, 1953 |
| 2,654,405 | Hulfish | Oct. 6, 1953 |
| 2,725,905 | Pulera | Dec. 6, 1955 |